United States Patent Office 3,502,619
Patented Mar. 24, 1970

3,502,619
METHOD OF PREPARATION OF PERHALO-
ACETONEEPOXIDE POLYMERS
Harry A. Smith, Midland, Mich., assignor to The Dow
Chemical Company, Midland, Mich., a corporation of
Delaware
No Drawing. Filed Nov. 15, 1968, Ser. No. 776,259
Int. Cl. C08g 15/00
U.S. Cl. 260—63                                    6 Claims

ABSTRACT OF THE DISCLOSURE

This invention is concerned with a process for the preparation of interpolymers of perhaloacetones and epoxides employing metals of Groups Ia, II, III and VIII as initiators for the polymerization reaction. The polymers produced thereby are useful as structural materials, films, coatings and the like.

---

This invention relates to a novel process for the interpolymerization of perhaloacetones and alkylene oxides employing the metals of Groups Ia, II, III and VIII as initiators for such interpolymerization.

The copolymerization of a perhaloacetone (such as hexafluoroacetone) and a lower alkylene oxide in the presence of an initiator such as cesium fluoride is described in U.S. 3,316,216.

It is an object of this invention to provide to the art a new method for the preparation of interpolymers of perhaloacetone and alkylene oxides. A further object is to provide to the art a new group of initiators useful to catalyze and promote said interpolymerization reaction. These and other objects and advantages will become apparent from a reading of the following detailed description.

It has now been discovered that the metals of Groups Ia, II, III and VIII are effective initiators for the interpolymerizaiton of perhaloacetones and alkylene oxides. The use of such initiators produces high yields of such interpolymers in relatively short reaction times.

As used herein the expression "metals of Groups Ia, II, III and VIII" refers to the metals falling within such groups of the periodic system such as are shown in the periodic chart of the elements from Fundamental Chemistry, 2nd ed., by H. G. Deming. Group Ia contains monovalent metals such as potassium, sodium, lithium, rubidium, and cesium. Group II contains divalent metals such as magnesium, calcium, strontium, barium, zinc, cadmium and mercury. Group III contains trivalent metals such as aluminum, gallium, indium, tellurium and scandium and Group VIII contains such metals as iron, cobalt, nickel, lead, platinum, rhodium and ruthenium. While all of these metals are effective as catalysts for the initiation of the reaction herein, the preferred catalysts are sodium, potassium, calcium, zinc, cobalt, aluminum and magnesium, with potassium usually being the most desirable because of the unusually high yields and short reaction times obtainable therewith.

The term "halo" as used herein with reference to the ketone reactant is meant to include the chloro- and fluoro-substituents. Perhaloacetones suitable for use in the present invention include perfluoroacetone (hexafluoroacetone), perchloroacetone, (hexachloroacetone) as well as mixed chloro- and fluoro-substituted perhalo-substituted acetones. Illustrative mixed perhalo-substituted acetones include dichlorotetrafluoroacetone, tetrachlorodifluoroacetone, monochloropentafluoroacetone, pentachloromonofluoroacetone and the like. Perfluoroacetone is a particularly desirable reactant in that it leads to highly fluorinated polymeric products.

Alkylene oxides suitable for use in this invention include aliphatic and aromatic alkylene oxides having from about 2 to about 16 carbon atoms, preferably from about 2 to about 8 carbons in the hydrocarbon chain, e.g. 1,2-epoxyethane (ethylene oxide), 1,2-epoxypropane (propylene oxide), 1,2-epoxybutane (butylene oxide), cis and trans 2,3-epoxybutane, 1,2-epoxy-1-phenylethane (styrene oxide) and mixtures thereof.

According to the process of this invention, substantially anhydrous reactants are admixed in a reaction vessel with the desired metal catalyst. The proportions of perhaloacetone to alkylene oxide are not critical but usually a 1:1 ratio is employed since the interpolymer product usually contains about equimolar proportions of perhaloacetone and alkylene oxide. Proportions of initiator of from about 0.001 to about 5% by weight based on the perhalocetone present may be employed but from about 0.01 to about 1.0 percent by weight of initiator is preferred. Less than 0.001% causes the reaction to be too slow to be practical and proportions greater than about 5.0% by weight tend to produce low molecular weight polymers.

After admixing the reactants and the initiator, the polymerization reaction is conducted at a temperature of between about 0° C. and about 100° C., preferably between about 15° C. and 50° C. At temperatures below about 0° C., the polymerization is generally too slow and at temperatures above about 100 °C. dioxalanes tend to be formed preferentially to the polymer. While the pressure during the polymerization is not critical, it usually is more convenient to conduct the polymerization under autogenous pressure. If desired the polymerization can be carried out in the presence of an inert solvent such as a hydrocarbon or chlorocarbon.

The time required for polymerization to take place depends upon the monomers or reactants employed, the temperature during the polymerization step and the concentration of initiator employed. In general, however, a time of at least 4 hours is required to achieve an acceptable yield of polymer and polymerization times of 4 days or more are frequently employed.

After polymerization, the product is removed from the reaction vessel and purified by stripping or by solvent extraction to remove any unreacted monomers or low molecular weight materials therefrom.

The resulting perhaloacetone-alkylene oxide interpolymers range in physical characteristics from liquids or rubbery solids to hard crystalline solids which are substantially insoluble in a wide variety of conventional solvent materials, e.g. mineral acids, such as concentrated sulfuric acid, inorganic bases such as aqueous sodium hydroxide, dimethyl sulfoxide, dimethyl formamide, water, and the like. Solubility of such polymers will depend, however, on the particular alkylene oxides employed and on the molecular weight of the polymer. In general, solvents having intermediate polarity are most effective. The solid polymers find structural uses but the polymers of this invention are particularly suitable as protective films for the surface coating of metals, glass ceramics, plastics, wood and the like.

The following examples will serve to further illustrate the present invention but are not to be construed as limiting the scope thereof.

EXAMPLE 1

To an oven-dried glass reaction tube conatining 0.004 gm. ($1 \times 10^{-4}$ gm. atoms) of potassium metal was added 3.0 gm. (0.0181 mole) of hexafluoroacetone and 3.1 gm. (0.043 mole) of 1,2-butylene oxide containing less than 30 p.p.m. water. The tube was then sealed and warmed to room temperature. During the warming step, the potassium metal rapidly dissolved in the monomers. The reactants wree then agitated by shaking and allowed to react at room temperature for 4 days. At the end of the reaction period, the reactor was opened and excess monomer was removed by venting, followed by evacuation. The product obtained was a polymer weighing 4.3 gm. and therefore representing 100% yield. Elemental analysis of the product showed it to have a mole ratio of 1 part hexafluoroacetone per 1.2 parts butylene oxide. The polymer was a clear rubbery solid having a softening point of 35–40° C. and soluble in acetone, methylene chloride and ethyl acetate.

The same polymerization conducted employing sodium metal as the initiator produced a 65 wt. percent yield of a clear rubber solid polymer having substantially the same properties as the polymer prepared using potassium as the catalyst.

EXAMPLE 2

In the same manner as Example 1, portions of hexafluoroacetone (HFA) and 1,2-butylene oxide (B.O.) were copolymerized in the presence of various metal initiators. The results of such experiments are summarized in the following table:

| Catalyst | Monomers | Reaction Time, Days | Temp. | Percent Yield | Description |
|---|---|---|---|---|---|
| Mg (powder) | HFA+B.O | 4 | Room | 11.6 | Clear oil. |
| Zn (powder) | HFA+B.O | 3 | do | 10.5 | Do. |
| Ca (lump) | HFA+B.O | 7 | do | 21.0 | Do. |
| Co (powder) | HFA+B.O | 4 | do | 21.0 | Do. |
| Al (powder) | HFA+B.O | 4 | do | 18.5 | Do. |

EXAMPLE 3

In the same manner as Example 1, hexafluoroacetone was interpolymerized with one or more alkylene oxides in the presence of potassium metal as an initiator. The results of such experiments are summarized in the following table:

| Mole ratio of Monomers | Polymerization Temp., ° C. | Reaction Time, Days | Yield, Wt. percent | Polymer Description |
|---|---|---|---|---|
| Hexafluoroacetone/ethylene oxide, 1.81/4.3. | 25 | 4 | 79 | White crystalline solid having a melting point of 188–192° C., insoluble in ketones, esters and chlorocarbons below 130° C. |
| Hexafluoroacetone/propylene oxide, 181/4.3. | 25 | 4 | 96 | Clear rubbery solid with a softening point of 35–45° C., soluble in ketones, esters and CH$_2$Cl$_2$. |
| Hexafluoroacetone/propylene oxide/ethylene oxide, 1.81/2.15/2.15. | 25 | 4 | 95 | Clear rubbery solid with a softening point of 57–63° C., soluble in ketones and esters and having the following mole ratio composition—HFA/PO/EO=100/95/5. |

I claim:
1. A process for the polymerization of perhaloacetones with alkylene oxides which comprises contacting perhaloacetone with an alkylene oxide containing from 2 to 16 carbon atoms in the presence of a catalyzing amount of an initiator selected from the group consisting of the metals of Groups Ia, II, III and VIII at a temperature of between about 0° C. and 100° C. for a time sufficient to produce polymerization.

2. The process of claim 1 wherein the metal initiator is present in the reaction mixture in a proportion of from about 0.001 to about 5 percent by weight of perhaloacetone.

3. The process of claim 1 wherein the reaction temperature is between about 15° and 50° C.

4. The process of claim 1 wherein the pressure during the reaction is autogenous pressure.

5. The process of claim 1 wherein the alkylene oxide contains from 2 to 4 carbon atoms.

6. The process of claim 1 wherein the catalyst is magnesium, zinc, calcium, sodium, cobalt, aluminum or potassium.

References Cited

UNITED STATES PATENTS 3,316,216  4/1967  Fawcett et al. _____ 260—63

WILLIAM H. SHORT, Primary Examiner

L. L. LEE, Assistant Examiner

U.S. Cl. X.R.

260—2, 615